Jan. 9, 1923.

H. A. VON STEIN.
CORN HARVESTER AND SHOCKER.
FILED NOV. 7, 1919.

Patented Jan. 9, 1923.

1,441,897

UNITED STATES PATENT OFFICE.

HENRY A. VON STEIN, OF JENERA, OHIO.

CORN HARVESTER AND SHOCKER.

Application filed November 7, 1919. Serial No. 336,437.

*To all whom it may concern:*

Be it known that I, HENRY A. VON STEIN, citizen of the United States, residing at Jenera, in the county of Hancock and State of Ohio, have invented certain new and useful Improvements in Corn Harvesters and Shockers, of which the following is a specification, reference being had therein to the accompanying drawing.

My invention relates to improvements in corn harvesters and shockers, and is of that type which is adapted to simultaneously cut two rows of standing corn, feed the cut corn to a rear shock compartment in which it is compressed, and after being tied into a shock is deposited in the field.

One object of my present improvement is to provide a corn harvester and shocker which is simple and light in construction, whereby it can be drawn by a single animal for simultaneously cutting and shocking two rows of corn.

Another object of my present invention is to provide a novel mechanism for lifting and holding the standing corn to be cut and carrying the cut stalks rearward to a shocking compartment in which it is collected to be tied into a shock.

A further object of my invention is to provide the shocking compartment of a corn harvester with a removable bottom and a novel and improved manner of moving the bottom to open and closed positions.

Further objects and advantages of the present improvement will appear from the following description and drawings, in which—

Fig. 8 is a detached combined section and perspective view of a part of one of my improved harvester rakes to show the specific construction thereof.

Figures 4, 6:
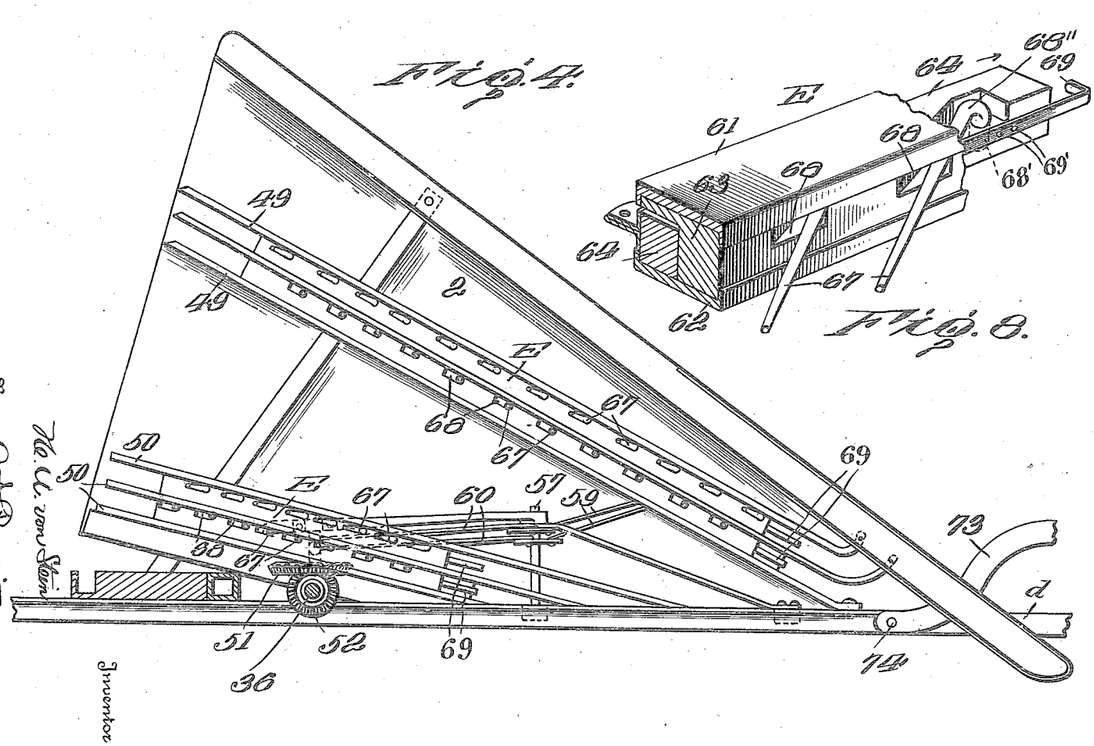
Fig. 4 is a vertical section taken through one of the corn-receiving and feeding ways and showing the feeding rake in position therein.
Fig. 6 is a detached perspective view of a part of one of my improved harvester feeding rakes.

My improved harvester comprises two parallel combined corn stalk supporting and feeding ways A, which extend longitudinal the machine and terminate in longitudinally extending shocking compartments B. These combined supporting and feeding ways A are formed by outer and inner vertical walls 1 and 2, the upper edges 3 of each of these walls extending at an angle upwardly and rearwardly. As shown in Fig. 4, the upper edges of the walls 1 and 2 taper downwardly, whereby the combined supporting and feeding ways A are in side elevation approximately triangular in shape.

Shocking compartments.

Figure 1:
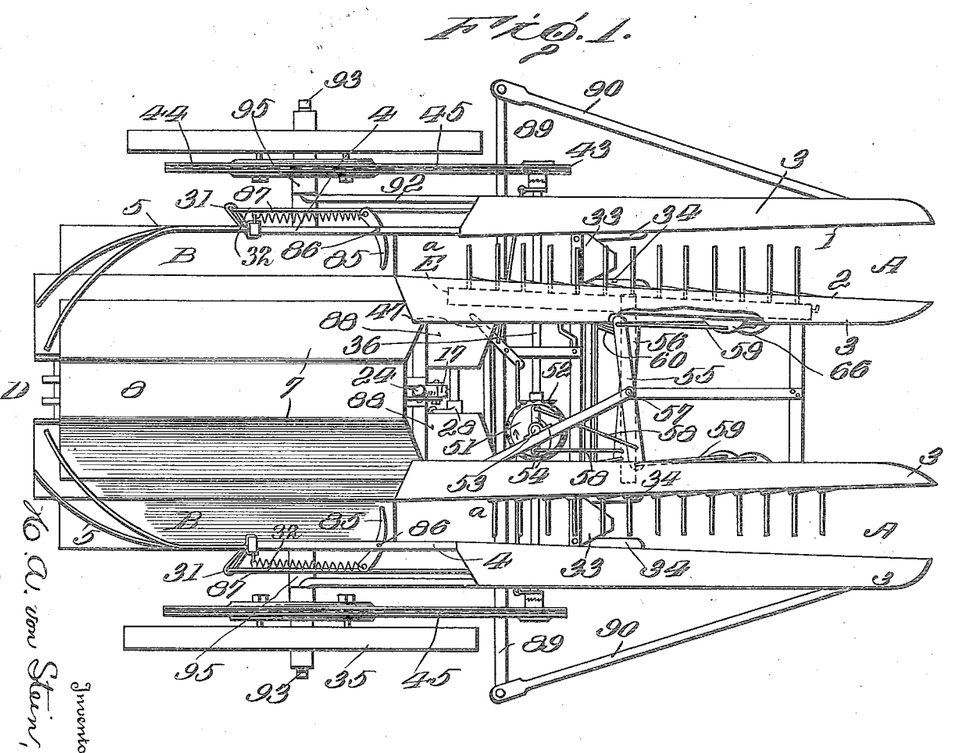
Figure 1 is a top plan view of a corn harvester and shocker embodying my invention, omitting the front draft truck of the machine.
Figures 2, 9, 10:
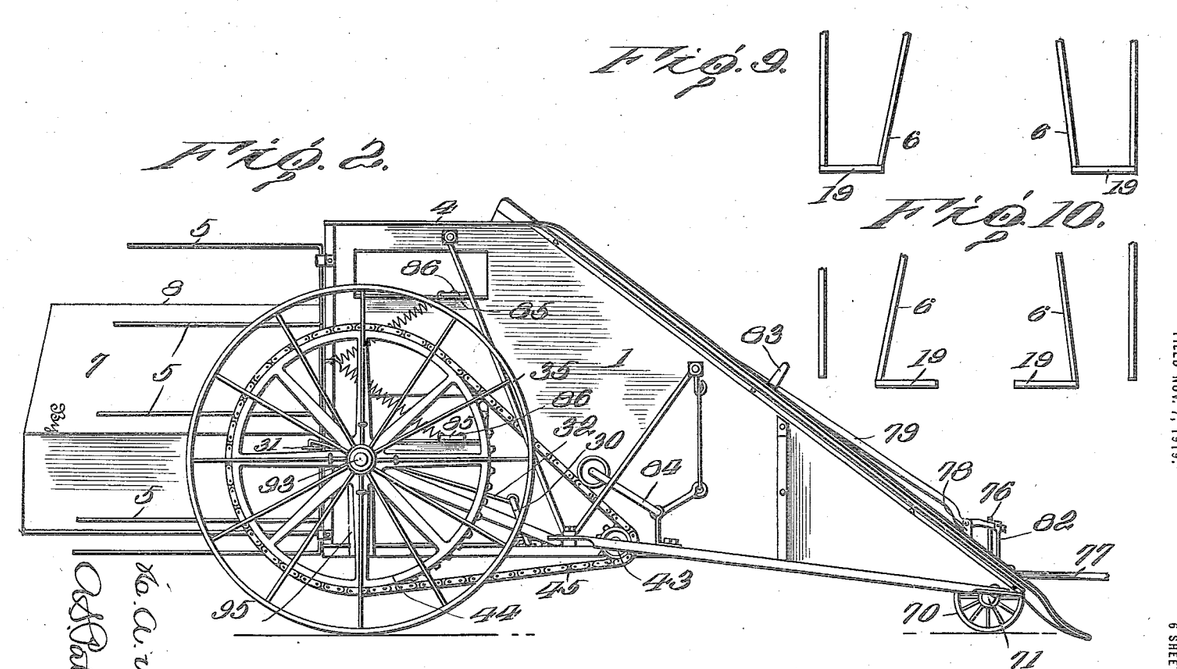
Fig. 2 is a side elevation of my improved harvester and shocker.
Fig. 9 is a diagrammatic view of the shocking compartments with their bottoms closed.
Fig. 10 is a diagrammatic view of the shocking compartments showing the bottoms open to discharge the shock therefrom.
Figure 3:
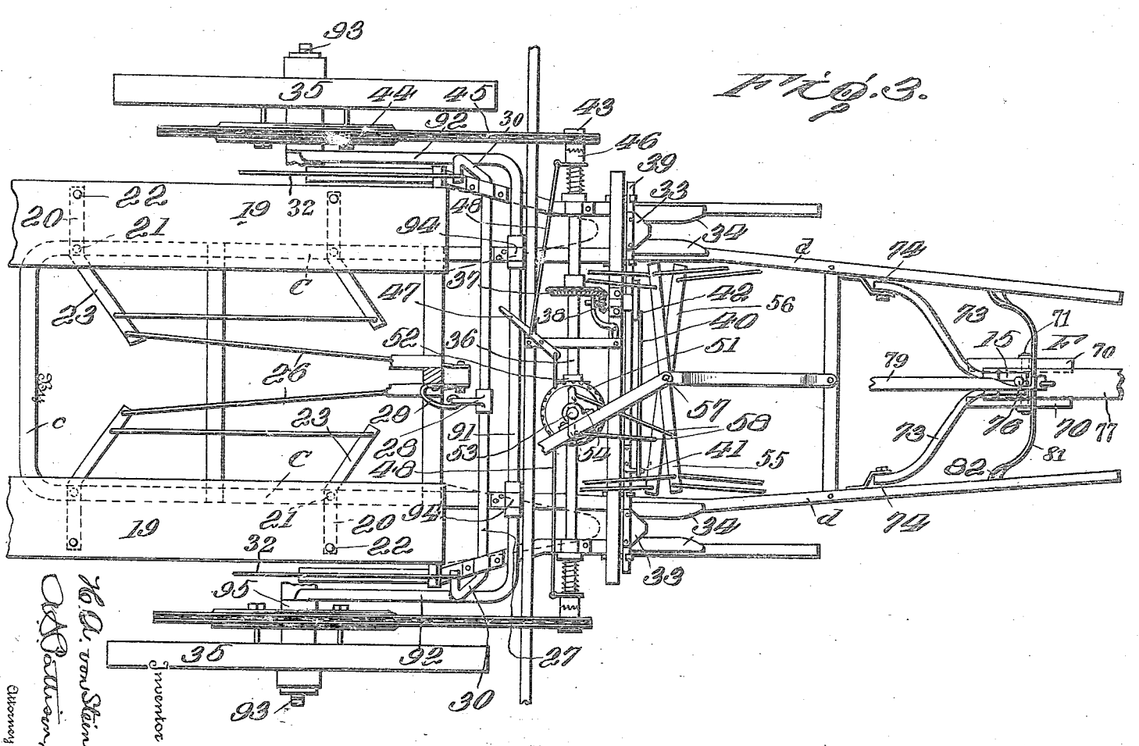
Fig. 3 is a top plan view of my improved harvester and shocker with the corn receiving and feeding ways and gates 5 are omitted.

The shocking compartments B of my improved harvester have their inner receiving ends in open communication with the delivery ends of the supporting and feeding-ways A, and constitute an unbroken continuation thereof, so that the cut corn stalks are fed from the feeder compartments *a* directly into the receiving ends of the shocking compartments B. The outer walls of the shocking compartments B comprise vertical walls 4, which are a continuation of and in longitudinal lines with the outer walls 1 of the receiving and feeding ways A. Pivoted to the rear ends of the walls 4 are end gates 5, which have their ends curved inwardly and close the rear ends of the shocking compartments B when closed, as shown in Fig. 1. The operation of these gates will be presently described.

The bottom of the inner walls of the shocking compartments comprise upwardly and inwardly inclined portions 6, which are stationarily supported by the straps 6' which pass over and are suitably secured to the parallel bars 15. This frame extends longitudinal the machine, as shown with its rear portion c extending across the machine, and its forward end d extending outward under the front ends of the inner walls 2 of the combined receiving and feeding ways A.

Figure 5:
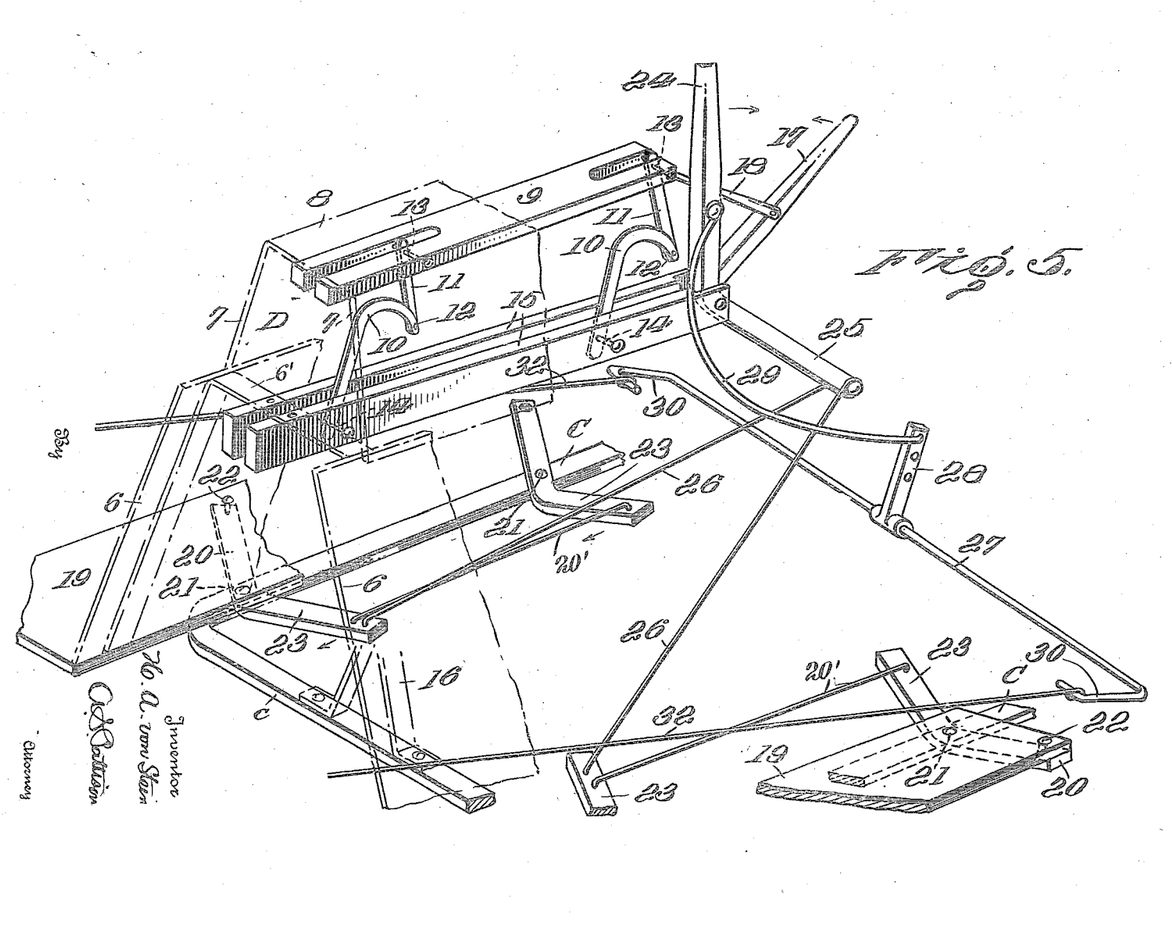
Fig. 5 is a fragmentary enlarged perspective view of the operating means of the shock-forming mechanism.

The upper portion of the inner walls of the shocking compartment B are vertically and longitudinally movable, and they comprise a member D which is approximately U-shaped in cross-section, as shown in dotted line Fig. 5, the depending portions 7 of the member D comprising the upper portion of the inner walls of the shocking compartments. The upper horizontal portion 8, of the U-shape member D, is supported on a longitudinally extending bar 9, located at the under side of the horizontal portion 8. This bar 9 is supported upon the links 10 and 11, which have their ends 12 pivotally connected as shown in Fig. 5. The upper ends of the links 11 are pivoted to the bar 9, at 13, and the lower ends of the bars 10 are pivotally supported at 14, between the parallel stationary bars 15. These latter mentioned bars are supported in any suitable manner from the frame C by suitable standards 16, which project upward from the rear portions c of the frame C. An operating lever 17 has its lower end pivoted between the front ends of the stationary bars 14 and is connected with the bar 9, by a suitable link 18. As shown in Fig. 5, the upper ends of the links 10 are forwardly inclined so that the pivotal points 12 are located in a vertical plane in front of the pivotal points 14, whereby when the operating lever 17 is moved in the direction indicated by the arrow, the bar 9 and the top walls D are moved upwardly and rearwardly, for the purpose of first slightly lifting the shock as it is deposited upon the ground.

The bottoms 19 of the shocking compartments B are inwardly movable for the purpose of opening the bottom of the shocking compartments to deposit the shocks on the ground. This is accomplished by providing two angle levers 20 for each of the bottoms or bottom-boards 19. These angular levers 20 are intermediately pivoted at 21 to the side portions of the machine frame C, as clearly shown in Fig. 5, while the outer ends of the levers 20 are pivotally connected at 22 to the bottom boards 19. When the free ends 23 of the levers 20 are moved by links 26 and 20' in the direction indicated by the arrow, Fig. 5, the bottoms 19 are swung forwardly and inwardly, thus opening the bottom of the shocking compartments B to deposit the shock on the ground.

The operating lever 24 is intermediately pivoted between the forward ends of the stationary bars 14, as shown in Fig. 5, and the lower end 25 of this lever is connected with the inner free ends of the angle levers 20, by suitable links 26 and 29', whereby when the lever 24 is moved in the direction indicated by arrow, the levers 20 are moved and swing the bottoms 19 forwardly and inwardly, as described. At the same time that the bottoms 19 of the shocking compartments are opened, the gates 5 are moved outwardly to open the rear ends of the shocking compartments, so that after the shock has been deposited on the ground, the machine is permitted to move forward and the shock permitted to pass out the rear end of the shocking compartment B. This movement of the gates 5 is accomplished by the movement of the lever 24 through a mechanism comprising a horizontal pivoted rod 27, carrying an operating arm 28, which arm is operatively connected with the lever 24, by a suitable link 29. The outer crank-shaped ends 30 of the bar 27 are connected with crank arms 31, by means of links 32. By this arrangement when the operating lever 24 is moved in the direction indicated by arrow, Fig. 5, to throw open the bottoms 19 of the shocking compartments B, the gates 5 at the same time are swung open by the mechanism just described.

*Cutting mechanism.*

Suitable reciprocating knives are located near the inner end of the receiving and feeding ways A, and these reciprocating knives co-operate with stationary knives 34 for cutting the corn that is fed to them in a manner to be explained presently. These knives 33 are operated by the combined supporting and driving wheels 35 in a manner which will now be described.

A rotating shaft 36 extends across the machine in rear of the knives 33, and this shaft carries a beveled gear 37, meshing with a beveled pinion 38, which is operatively connected with the knife bar 39, by means of a connecting rod 40, having its end 41 connected with a knife bar 39, and its opposite end connected with a crank 42, operatively connected with the beveled pinion 38, all of which is well understood by those skilled in this art, and, therefore, need not be more fully illustrated or described. The outer ends of the shaft 36, carry loose sprocket wheels 43, which are operatively connected with sprocket wheels 44 on the drive wheels 35 by a sprocket chain 45. Suitable spring actuated clutch members 46 are carried by the ends of the shaft 36, which are operated by a lever 47, the lever being connected with the clutch members 46, by suitable links 48, whereby the clutch members are thrown in and out of operation with the loose sprocket wheels 43, for the purpose of connecting and disconnecting the drive wheels 35 with the shaft 36.

Feeding mechanism.

The means for feeding the corn stalks to the knives and backward to the shocking compartments B, consists of a plurality of rake members E. These rake members E are movably supported by the inner walls 2 of the feed-ways A. These rake members E are supported in suitable cutting and supporting ways 49 and 50, and these ways and rake members are arranged respectively in upper and lower pairs. The ways 49 and 50 extend at an angle approximately corresponding to the angle of the upper edge of the side walls 1 and 2 of the feed-ways A, as shown clearly in Fig. 4. The upper and lower rake members E are constructed alike, and their specific construction will be presently pointed out. In operation the two upper rake members E are reciprocated in opposite directions, that is to say, when one of the rake members E is moved forward, the other is moved rearward, and vice versa. The same is equally true of the lower pair of rake members E. The means for reciprocating these rake members in the manner just mentioned will now be described.

A horizontally beveled gear 51 meshes with a beveled pinion 52 carried by the horizontal shaft 36, whereby the former gear is rotated. The shaft 53 of the gear 51 is provided with oppositely extending crank arms 54.

Two levers 55 and 56 are intermediately supported at the point 57 between the inner walls of the feed-ways A, and one of the ends of these levers 55 and 56 are respectively operatively connected with the cranks 54, by the links 58, so that the said levers are reciprocated in opposite directions. The ends of these levers 55 and 56 are connected with the upper rake members E, by upwardly and forwardly extending links 59, and with the lower rake member E by the links 60. Since the corresponding ends of the levers 55 and 56 are reciprocated in opposite directions, it will be understood that the upper and lower pairs of rake members E are reciprocated in corresponding directions, so that when one of the upper and lower rake members E are moving in one direction, the other upper and lower rake member is moving in the opposite direction.

Rake members.

My improved rake members comprise a housing made up of two oppositely extending U-shaped members 61 and 62, in which are mounted two reciprocating members 63 and 64. The U-shaped members are connected at their inner sides by sufficient numbers of connecting bars 65, to firmly hold the U-shaped members in the relative positions shown. The reciprocating member 64 is provided with an inwardly projecting ear 66, to which the ends of the operating links 59 and 60 are respectively connected. A plurality of rake-fingers 67 have their inner ends 68″ provided with lateral ends 68′, which are pivoted in the reciprocating members 64 of the rakes, and these fingers 67 project through angularly extending slots 68 formed in the reciprocating member 63. The lower or forward ends of the members 63 are provided with inwardly extending stop members 69 adapted to be engaged by the adjacent lower and forward ends of the reciprocating members 64. The member 64 is the operative member of the rake since it is connected with the operating crank shaft 53, and it has a limited reciprocating movement independent of the member 63 in both directions. The independent reciprocation in the direction indicated by arrow, Fig. 8, is limited by the stop member 69 secured to the member 63 through screw openings 69′ and the independent reciprocation in the opposite direction is limited by the limitation of the swinging or pivotal movement in the slot 68 of the member 63. That is to say, the pivotally swinging movement of the finger 67 is limited by the end-walls of the slots 68.

When the reciprocating rake members 63 and 64 are moving forward, the rake fingers are retracted or swung backward, and when the rake members are moved rearward, its fingers 67 are turned on their pivots and extended or swung outward to engage the corn stalks and move them rearward to the cutter knives and to the shock compartments B and a. The extended and contracted movements of the rake fingers are effected in the following manner: With the rake members at the limit of their rear movement and the rake-fingers extended, the member 64 moves forward independent of the member 63 until the forward end of the member 64 engages the stop 69 carried by the member 63. This independent movement swings the rake fingers inward and from that point on the members 63 and 64 move together to their forward position with the rake fingers contracted. When the member 64 starts rearward, it moves independently of the member 63, thus swinging the rake fingers on their pivots and causing them to extend until they lock against the wall of the slot 68, when the two rake members move rearward together with the fingers extended for the purpose described. The member 64 is held between the U-shaped members 61 and 62 with sufficient friction to insure the member 64 having the independent forward and rearward movements above explained for the purpose of retracting and extending the rake fingers.

Draft truck.

Figures 6, 7, 11:
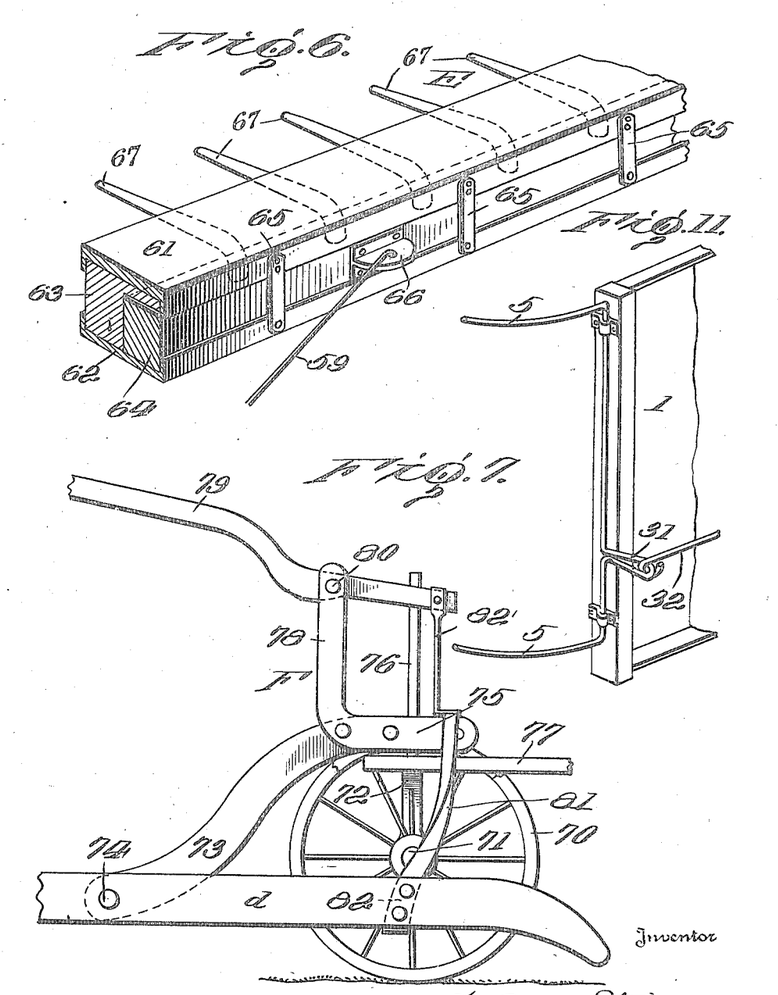
Fig. 7 is a side elevation of my improved front draft truck.
Fig. 11 is a detached perspective view showing one of the gates for the outlet ends of the shocking compartments.

The forward end of the machine is provided with a draft truck F. This draft truck F comprises two wheels 70, mounted on an axle 71, and this axle is supported between depending arms 72. A V-shaped frame 73 has its rear ends pivoted at the point 74 to the sides of the front end *d* of the frame C, and a vertical pivotal rod 76 passes through the front end 75 of the frame 73, the bar 76 acting as a pivotal point for turning the wheels horizontally in either direction. A suitable draft bar 77 is connected with the front truck in any suitable manner. Projecting upward from the front end of the frame 73 is an arm 78, and a lever 79 is intermediately pivoted to this arm at 80. A U-shaped strap 81 has its lower ends 82 rigidly connected to the front end *d* of the frame C, and it extends over the front end 75 of the frame 73. A suitable link 82' connects the top of this strap 81 with the front end of the lever 79.

By means of this construction, the front end of the frame C is raised and lowered for the purpose of regulating the height of the front end of the frame C. A depression of the lever 79 will lift the front end of the frame *d* upward through the intervention of the strap 81, and link 82. the frame 73 turning on its pivot 74, and the front truck sustaining the weight of the front end of the frame *d* in any of its positions. For the purpose of holding the lever 79 in its depressed position, a suitable latch 83 is provided under which to hook the free end of the lever 79.

Suitable chain tighteners 84 are provided for the driving chains 45, to take up any slack that may be occasioned therein from wear or otherwise.

The rear ends of the feeder compartments *a* are formed by a plurality of spring held levers 85, which have their inner ends extending thereacross, as shown in Fig. 1. These levers are intermediately pivoted at 86 and are normally held with their inner ends extending across the rear portions of the feeding compartments *a* by suitable springs 87.

One or more platforms 88 are provided for the operator and driver. These platforms are located substantially at the center of the machine where the levers 17, 24 and 47 can be readily reached from the platforms for operation.

The outer ends of the outer walls of the feed-ways A are braced by suitably arranged brace-rods 89 and 90.

Any suitable axle is provided for the combined supporting and driving wheels 35, but as here shown, these axles comprise a U-shaped rod having a transverse portion 91 and the longitudinally extending portions 92. The axles 93 for the wheels 35 are formed by bending the ends of the portions 92 outward at right angles, as shown. By supporting the axles 93 on the ends of a U-shaped bar, as described, so places the axle that it does not interfere with any of the mechanism of the machine and makes the pull directly on the frame C by attaching the rod 91 to the said frame at the points 94. The rod 91 is prevented from oscillating in its connections 94 by having the inner ends of the axles 93 connected to the lower edges of the outer walls 1, through the medium of flat connecting members 95.

The front pointed ends of the feed-ways move under any laterally extending corn stalks, as the machine moves forward and lifts them to proper position to be fed by the rake members to the cutter knives.

The movable top walls D of the shocking compartments assist in relieving the weight of the shock on the movable bottom, when the inclined walls are lifted and facilitates the dumping of the shock.

The cut stalks are fed rearward into the compartment *a* and packed up against the yielding members 85 until the compartments *a* are filled and pressure on the corn stalks is sufficient to force the yielding members 85 rearward, at which time the stalks pass into the shocking compartment. When the shocking compartment is filled, the machine is stopped and the tops of the corn stalks tied together before the shock is dumped.

Having thus described my invention, what I claim and desire to secure by Letters Patent is—

1. A corn harvester and shocking machine, comprising parallel feed-ways, separate shocking compartments at the opposite sides of the machine having parallel walls extending rearward in a direct line with the feed-ways and having their inner ends open to receive the cut stalks from the rear ends of the feed-ways, stalk feeding members in the feedways, cutters located adjacent the lower rear ends of the feed-ways, combined supporting and driving wheels, means operatively connected with the wheels for operating the cutters, compartments *a* located back of the feed ways, and spring held members backwardly movable by the pressure of the stalks out of the compartments *a* to permit the rearward movement of the stalks to the shocking compartments.

2. A corn harvesting and shocking machine, comprising a feed-way, a shocking compartment in communication with the feed way, and having parallel walls in line with the walls of the feed way, a cutter knife in the feed way, feeding means in said feed way to feed the uncut stalks to the cutter and the cut stalks to the feed-way, rearwardly yielding members extending transverse of the feed-way at the junction of the shocking compartment therewith, a movable gate at the rear end of the shocking compartment, a movable bottom for the shocking compartment, and means for opening and closing the said bottom, the parts arranged substantially as described.

3. A corn shocker comprising a feed-way, a cutter knife in the feed-way, a shocking compartment communicating with the rear end of the feed-way, feeding means in the feed way to feed the uncut stalks to the cutter and the cut stalks to the shocking compartment, the shocking compartment having the upper portion of its inner wall vertically movable, for the purpose described.

4. A corn harvester, a shocking machine comprising parallel feed-ways, parallel shocking compartments extending in a line with the feed ways and having their receiving ends in communication with the delivery ends of the feed ways, cutter knives in the said feed-ways, feeding means in the feed ways feeding the uncut stalks to the knives and the cut stalks to the shocking compartment, the inner walls of the shocking compartments being vertically movable, for the purpose described.

5. A corn harvester and shocking machine, comprising parallel feed-ways, parallel shocking compartments in communication with the feed-ways, cutter knives in the feed ways, feeding means in the feed-ways for feeding the uncut stalks to the cutter knife and the cut-stalks to the shocking compartments, the top of the inner walls of the shocking compartments connected and vertically movable together, the said movable walls being tapered inwardly, and means for moving the said tapered walls vertically simultaneously.

6. A stalk feeding rake for corn harvesters, comprising two independent longitudinally movable members, a housing therefor, fingers passing loosely through one of the said members and pivoted to the other, and means for moving the members independently a limited distance to extend and retract the pivoted fingers, and thereafter move the two members together, for the purpose described.

7. A feeding rake for corn harvesters, comprising two independently movable members, a housing therefor and in which the members longitudinally move, rear fingers passing loosely through openings in one member and pivoted to the other member, operative means connected to the finger carrying member and a stop carried by the other member to limit the independent movement of the finger carrying member, whereby the fingers are extended and retracted by the independent movement of the finger carrying member.

8. In a corn harvesting machine, a feed-way provided with longitudinally extending rake-member receiving-ways, rake members located therein, the rake members carrying pivoted fingers, the said rake-members constructed to extend the fingers when moved backward and to restrict them when moved forward, for the purpose described.

9. In a corn harvesting machine, a longitudinally extending feed-way provided with parallel longitudinally extending rake-member receiving-ways, independently movable rake-carrying members within the ways, each rake member having a housing and two movable members within the housing, said movable members having a limited independent movement for extending the rake-fingers when moved backward and withdrawing them when moved forward, and operative means for reciprocating the rake-members in opposite directions, for the purpose described.

10. A corn-harvesting machine comprising a feed-way, having a wall with its upper edge tapered upwardly from its front end, for the purpose described, said feed-way wall having upwardly inclined rake-carrying ways, reciprocating rake-carrying members having rake fingers within the said ways, said rake-carrying members constructed to extend the rake-fingers when moved rearward and retract them when moved forward, pivoted levers operatively connected with and reciprocating the rake-carrying members and operating means for vibrating the levers in opposite directions whereby the rake-carrying members are reciprocated in opposite directions, for the purpose described.

11. A corn harvesting machine, comprising parallel feed-ways having inner and outer vertical walls, reciprocating rake-members supported by the inner walls, the rake-members having fingers adapted to be extended when the members are moved rearward and retracted when the members are moved forward, horizontal levers located between the inner walls of the feed-ways and intermediately pivoted, the ends of the levers operatively connected with the rake members of the two walls, and means for vibrating the levers in opposite directions and thereby reciprocating the rake members in opposite directions, for the purpose described.

12. A corn harvester having a frame, a shocking compartment, a horizontally slidable bottom therefor, two horizontal levers each intermediately pivoted to said frame, at separate points, the corresponding ends of the levers pivoted to said bottom, and means connected with the other ends of the levers for simultaneously swinging them on their intermediate pivots and thereby horizontally moving the bottom to open or closed positions.

In testimony whereof I hereunto affix my signature.

HENRY A. VON STEIN.